O. K. ARNOLD.
AGRICULTURAL IMPLEMENT.
APPLICATION FILED JUNE 22, 1916.
1,259,587.
Patented Mar. 19, 1918.
3 SHEETS—SHEET 3.
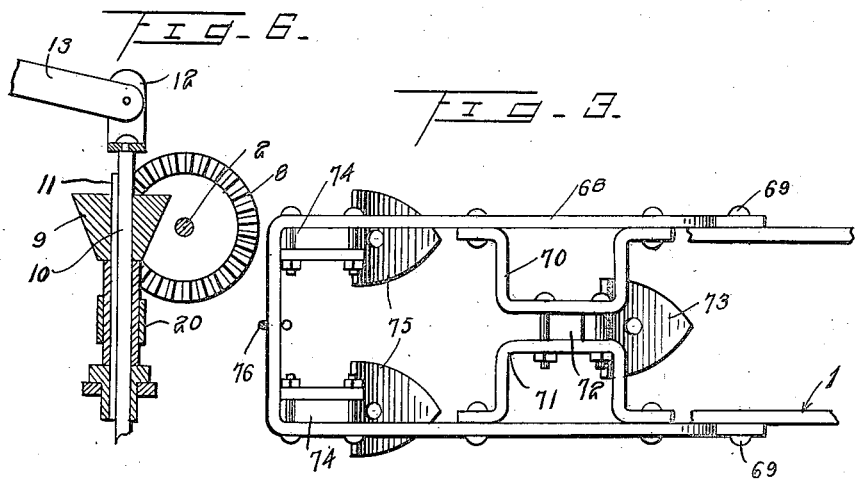
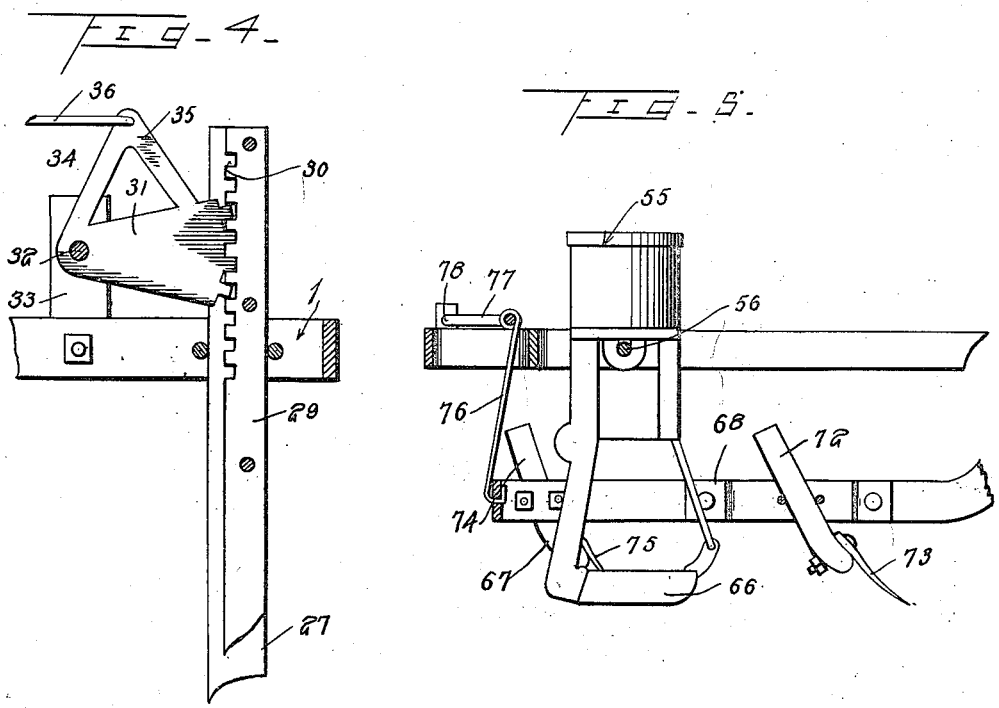
Witness
R. Stanton.
Inventor
O. K. Arnold.
By
Attorney

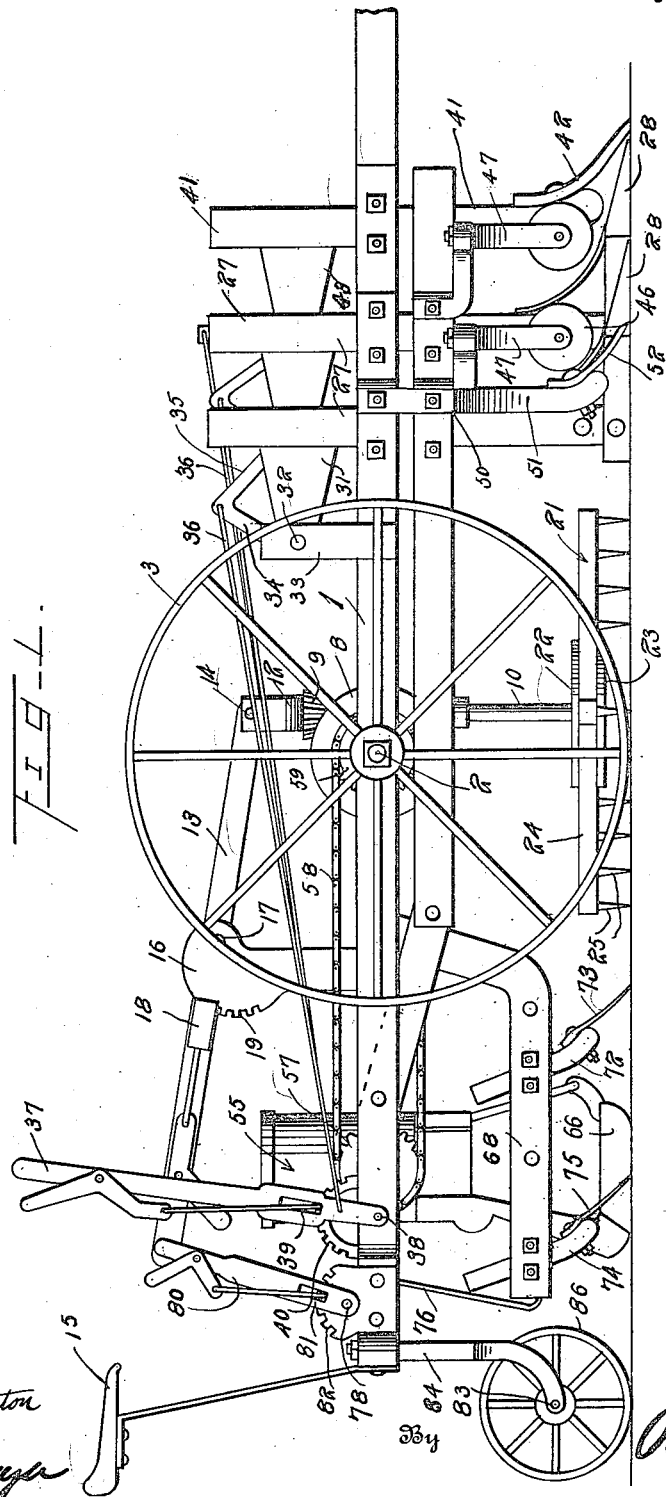

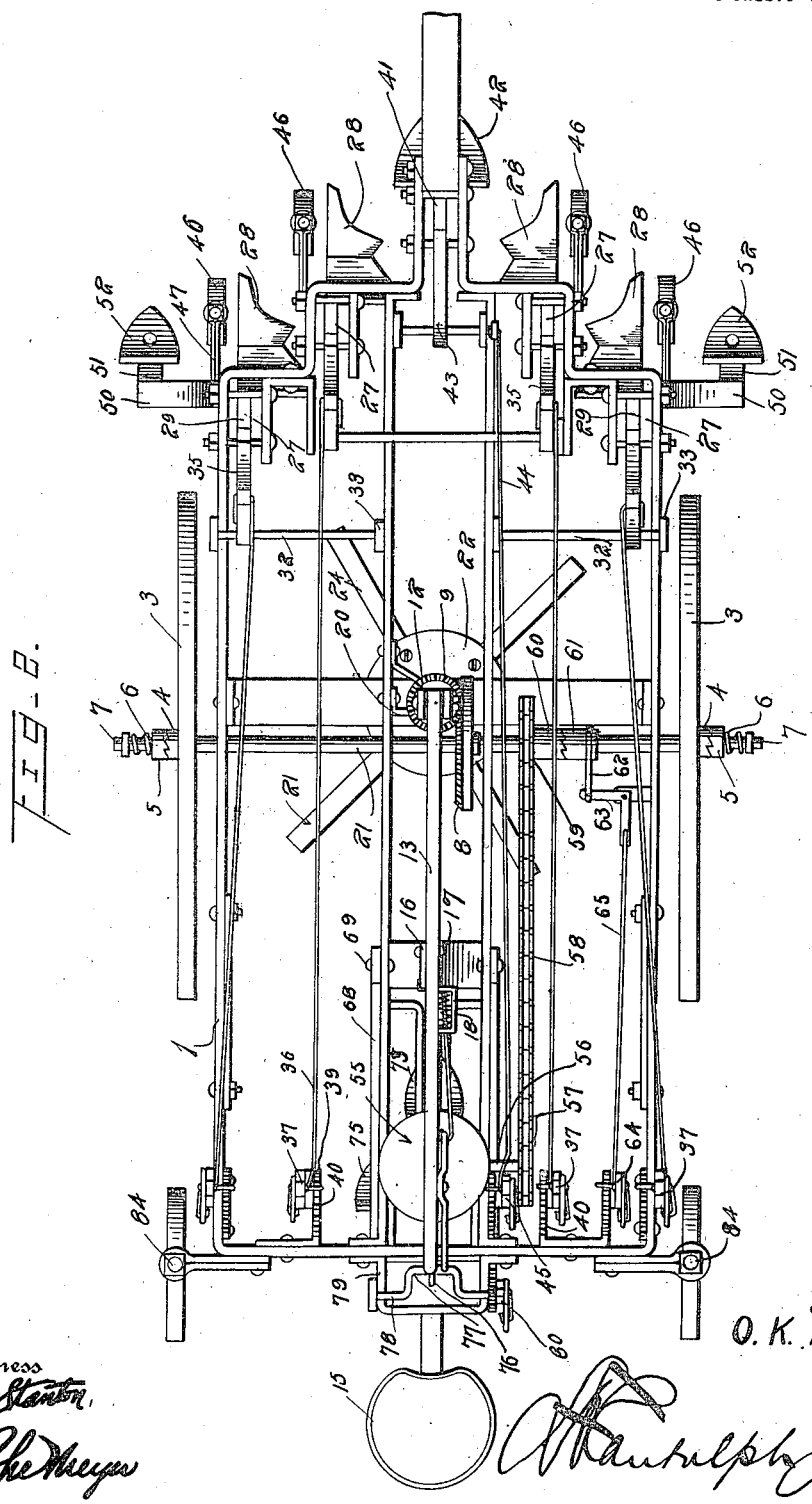

UNITED STATES PATENT OFFICE.

OLIN K. ARNOLD, OF McALESTER, OKLAHOMA.

AGRICULTURAL IMPLEMENT.

1,259,587.

Specification of Letters Patent.　　Patented Mar. 19, 1918.

Application filed June 22, 1916.　Serial No. 105,200.

*To all whom it may concern:*

Be it known that I, OLIN K. ARNOLD, a citizen of the United States, residing at McAlester, in the county of Pittsburg and State of Oklahoma, have invented certain new and useful Improvements in Agricultural Implements; and I do hereby declare the following to be a full, clear, and exact description of the invention, such as will enable others skilled in the art to which it appertains to make and use the same.

This invention relates to agricultural implements, and the primary object of the invention is to provide an implement which includes in combination, land breaking plows, a harrow, and a planter structure carried by a single frame which provides an implement that will break, pulverize and plant a field in one continuous operation.

Another object of this invention is to provide an agricultural implement as specified in which a plurality of breaking plows are employed and are adjustably carried by the forward portion of the supporting frame for vertical movement into or out of a ground engaging position.

A further object of this invention is to provide means for raising or lowering the breaking plows independently of each other which includes a lever having its forward end connected to a pivotally mounted segmental rack, the teeth of which mesh with rack teeth formed on the standards or beams of the plows.

A still further object of this invention is to provide a rotary harrow structure, which includes a harrow mounted for rotation in a horizontal plane, means for moving the harrow vertically into or out of a land engaging position and means for operating the harrow by rotation of the main supporting axle of the implement.

A further object of this invention is to provide a planter structure of the ordinary type which is carried at the rear end of the supporting structure of the implement and which is operatively connected to a harrow operating means for operating the planter upon operation of the harrow, and further to provide a pivotally mounted frame having a plurality of shovels carried thereby and arranged for opening a furrow in front of the planter structure and covering the furrow after the grain has been deposited therein.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved implement.

Fig. 2 is a top plan view of the implement.

Fig. 3 is a detail plan view of the pivoted shovel carrying frame.

Fig. 4 is a detail view of a part of the upper portions of the breaking plow standards.

Fig. 5 is a fragmentary section through the frame of the machine illustrating a part of the planter structure, and Fig. 6 is a fragmentary sectional view illustrating a part of a harrow construction.

Referring more particularly to the drawings, 1 designates the supporting frame of the agricultural implement as an entirety which rotatably supports a main supporting axle 2 upon which are mounted the usual type of supporting wheels 3. The hubs 4 of the supporting wheels 3 have clutch segments or ratchet teeth formed upon their outer surfaces which are provided for coaction with the ratchet teeth formed upon the inner face of collars 5 which are mounted upon the outer ends of the axles and held in engagement with the teeth formed upon the hubs 4 of springs 6 which are coiled about the outer end of the axle and held in place by nuts 7. The axle 2 has a bevel gear 8 mounted thereon which meshes with a bevel pinion 9. The pinion 9 is slidably mounted upon a vertical shaft 10, and it rotates the shaft 10 through the medium of a key 11 formed upon the shaft which fits in a keyway formed in the bore of the bevel pinion 9. The shaft 8 has its upper end swivelly connected to a bracket 12. The bracket 12 has a hand lever 13 pivotally connected thereto as shown at 14, and it extends rearwardly above the frame 1 of the machine into a position in close proximity to the seat 15 which is of the ordinary construction. A quadrant 16 is carried by the supporting frame 1, and the hand lever 13 is pivotally connected to the quadrant 16 as shown at 17. A dog mechanism 18 is carried by the hand lever 13 and coacts with the ratchet teeth 19 formed upon a portion of the edge of the quadrant 16 for holding the hand lever in various adjusted positions.

The shaft 10 is supported by a suitable bracket 20 and it has a harrow structure 21 mounted upon its lower end, which harrow structure includes upper and lower plates 22 and 23 which have the inner ends of a plurality of radiating bars 24 connected thereto. The bars 24 have harrow teeth 25 secured to their under surfaces and depending therefrom. The plates 22 and 23 are rigidly connected to the shaft 10 so that the harrow structure 21 will be rotated in a horizontal plane upon rotation of the vertical shaft 10 by the rotation of the axle 2.

A plurality of breaking plow structures are positioned forwardly of the harrow structure and they include standards 27 which have breaking plow structures 28 of the ordinary construction attached to their lower ends. The standards 27 are slidably supported, for vertical movement with respect to the frame 1 and they have rack bars 29 attached to their upper ends which rack bars are provided with the usual type of rack teeth 30. Segmental gears 31 are provided, which are pivotally supported as shown at 32 by suitable standards 33. The teeth of the segmental gears 31 mesh with the rack teeth 30 for raising or lowering the standards 27 upon pivotal movement of the segmental gears, for regulating the position of the breaking plows. The segmental gears 31 have arms 34 and 35 formed thereon the upper ends of which converge. Rods 36 are connected to the upper ends of the upper converged ends of the arms 34 and 35. The rods 36 have their rear ends connected to hand levers 37 which are pivotally carried by the frame 1 as shown at 38. The hand levers 37 have dog mechanisms 39 carried thereby which coact with quadrants 40 for holding the hand levers in various adjusted positions.

A standard 41 which is identical in construction to the standards 27 is carried by the center of the forward end of the frame 1 of the machine and it has a shovel plow 42 connected to its lower end which will throw the dirt upon each side of the plow. The standard 41 is moved vertically through the medium of a pivotally mounted segmental gear 43, rods 44 and a hand lever 45 in the same manner in which the standards 27 are moved vertically. Suitable colter wheels 46 are provided, which wheels are carried by standards 47 and are attached in any suitable manner to the supporting frame 1.

Arms 50 are attached to the frame 1 and project laterally therefrom, and they have shovel carrying standards 51 attached to their outer ends, to the lower ends of which standards are attached shovels 52. The shovels 52 are positioned directly in front of the supporting wheels 3 and are provided for leveling the ground over which the wheels travel.

A corn planter structure generically indicated by the numeral 55 is carried by the rear end of the frame 1, and it is operated by a shaft 56 which shaft has a sprocket 57 mounted thereon. A sprocket chain 58 travels about the sprocket 57 and about a sprocket 59 which is mounted upon the axle 2. The sprocket 59 has a clutch section 60 formed thereupon which is adapted for coaction with a clutch section 61 which is feathered upon the axle 2. The sprocket 59 is loosely mounted upon the axle for independent rotation thereof so that when the clutch segment 61 is shifted into engagement with the clutch section 60 the sprocket will be rotated synchronously with the rotation of the shaft. A lever 62 is connected to the clutch section 61 and to a bell crank 63 which is pivotally carried by the frame 1. A lever 64 is connected through the medium of a rod 65 to the bell crank 63 and it is provided for manually shifting the clutch section 61 into or out of engagement with the clutch section 60 which is formed upon the sprocket 69.

The corn planter structure 55 is of any ordinary construction employing the usual type of furrow opening shoe 66 and the grain delivery spout 67.

An auxiliary frame 68 is pivotally connected as shown at 69 to a portion of the frame 1 and it has substantially U-shaped brackets 70 and 71 secured thereto and extending inwardly toward each other which brackets support a standard 72. The standard 72 has a furrow opening shovel 73 mounted upon its lower end which is positioned in front of the furrow opening shoe 66 of the planter structure. A pair of standards 74 are carried by the rearmost portion of the frame 68 and they have furrow closing shovels 75 attached to their lower ends. A rod 76 is connected to the rear end of the frame 68 and it extends upwardly and is connected to the wrist of a crank portion 77 of the crank rod 78. The crank rod 78 is supported by an extension 79 formed upon the frame 1 and it has a hand lever 80 connected thereto which is provided with a dog mechanism 81 that coacts with a quadrant 82 for holding the lever and consequently the crank rod 78 in various adjusted positions for holding the frame 68 in various adjusted positions.

A plurality of standards 84 are swivelly carried by the rear corners of the frame 1 and they rotatably support axles 85 upon which the rear supporting wheels 86 of the implement are mounted.

While in the drawings and the foregoing description, a corn planter structure has been described it is to be understood that any desired type of planter or seeding structure may be employed in lieu of the ordinary type of planter structure set forth.

In the operation of the improved agricultural implement, the plow structures 28 and 42 are adjusted to the proper positions for turning or breaking the land, and the hand lever 13 is operated for lowering the harrow structure 21 into a land engaging position, after which the clutch section 61 is moved into engagement with the clutch section 60, so that upon the forward movement of the agricultural implement, the land will be broken by the breaking plow structures, harrowed and pulverized by the rotary harrow structure 21, after which furrows will be formed therein by the plow 73 into which furrows the grain will be planted by means of the planter structure 55. After the grain has been planted in the furrows, it will be covered by the covering shovels 75, thus in one continuous operation, a field may be prepared for planting and planted with a single machine.

From the foregoing description taken in connection with the accompanying drawings, the advantages of construction and of the method of operation of the improved agricultural implement will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In an agricultural implement structure, the combination of a portable supporting frame, furrow opening means carried by the forward end of said frame, land breaking means positioned rearwardly and laterally of the furrow opening means for breaking land and filling a furrow formed by the furrow opening means, means positioned rearwardly of said land breaking means for pulverizing the broken ground, furrow opening means positioned rearwardly of said land pulverizing means, and seed planting means for depositing seed in the furrow formed by said last-named furrow opening means.

2. In an agricultural implement structure, the combination of a portable supporting frame, furrow opening means carried by the forward end of said frame, land breaking means positioned rearwardly and laterally of the furrow opening means for breaking land and filling a furrow formed by the furrow opening means, means positioned rearwardly of said land breaking means for pulverizing the broken land, furrow opening means positioned rearwardly of said land pulverizing means, seed planting means for depositing seed in the furrow formed by said last-named furrow opening means, and furrow closing means for closing the furrow after the seed has been deposited therein.

3. In an agricultural implement structure, the combination of a portable supporting frame, furrow opening means carried by the forward end of said frame, land breaking means positioned rearwardly and laterally of the furrow opening means for breaking land and filling a furrow formed by the furrow opening means, means positioned rearwardly of said land breaking means for pulverizing the broken land, furrow opening means positioned rearwardly of said land pulverizing means, seed planting means for depositing seed in the furrow formed by said last-named furrow opening means, furrow closing means for closing the furrow after the seed has been deposited therein, and means for separately controlling the operation of said various means, whereby any one of them may be operated independently of the operation of any other one.

4. In an agricultural implement structure, the combination of a portable supporting frame, furrow opening means carried by the forward end of said frame, land breaking means positioned rearwardly and laterally of the furrow opening means for breaking land and filling a furrow formed by the furrow opening means, means positioned rearwardly of said land breaking means for pulverizing the broken land, an auxiliary frame pivotally suspended beneath said portable supporting frame, a furrow opening shovel carried by said pivoted frame, seed planting means carried by said portable frame for planting seed in a furrow formed by said shovel, a pair of furrow closing shovels carried by said pivoted frame rearwardly of said seed planting means, and means connected to the rear end of said pivoted frame for adjusting the elevation of said shovel.

In testimony whereof I affix my signature in presence of two witnesses.

OLIN K. ARNOLD.

Witnesses:
R. H. Cook,
A. C. Haden.